(12) United States Patent
Williamson

(10) Patent No.: US 10,211,708 B2
(45) Date of Patent: Feb. 19, 2019

(54) ELECTRIC MOTOR AND GENERATOR

(71) Applicant: James R. Williamson, Smyrna, GA (US)

(72) Inventor: James R. Williamson, Smyrna, GA (US)

(*) Notice: Subject to any disclaimer, the term of this patent is extended or adjusted under 35 U.S.C. 154(b) by 0 days.

(21) Appl. No.: 15/084,885

(22) Filed: Mar. 30, 2016

(65) Prior Publication Data

US 2016/0294259 A1  Oct. 6, 2016

Related U.S. Application Data

(60) Provisional application No. 62/140,016, filed on Mar. 30, 2015.

(51) Int. Cl.
| | |
|---|---|
| *H02K 11/33* | (2016.01) |
| *H02K 3/18* | (2006.01) |
| *H02K 21/14* | (2006.01) |
| *H02K 29/08* | (2006.01) |
| *H02K 1/27* | (2006.01) |
| *H02K 3/04* | (2006.01) |
| *H02K 3/47* | (2006.01) |

(52) U.S. Cl.
CPC .......... *H02K 11/33* (2016.01); *H02K 1/2746* (2013.01); *H02K 3/04* (2013.01); *H02K 3/47* (2013.01); *H02K 21/14* (2013.01); *H02K 29/08* (2013.01)

(58) Field of Classification Search
CPC ...... H02K 1/2746; H02K 21/14; H02K 29/08; H02K 3/04; H02K 3/47; H02K 7/1823
See application file for complete search history.

(56) References Cited

U.S. PATENT DOCUMENTS

| | | | | | |
|---|---|---|---|---|---|
| 2,383,996 | A | * | 9/1945 | Stucke | F02B 57/08 123/44 R |
| 3,763,708 | A | * | 10/1973 | Angele | G01C 19/58 310/90.5 |
| 4,791,850 | A | * | 12/1988 | Minovitch | F41B 6/00 102/489 |
| 4,961,352 | A | * | 10/1990 | Downer | F16C 32/0438 310/90.5 |
| 5,007,292 | A | * | 4/1991 | Crowe | G01H 11/00 310/90.5 |
| 5,138,209 | A | * | 8/1992 | Chuta | G11B 19/2009 310/51 |
| 5,396,136 | A | * | 3/1995 | Pelrine | F16C 32/0438 310/90.5 |
| 5,559,381 | A | * | 9/1996 | Bosley | B60L 11/16 310/74 |

(Continued)

*Primary Examiner* — Tulsidas C Patel
*Assistant Examiner* — Joseph Ortega
(74) *Attorney, Agent, or Firm* — Thomas Horstemyer, LLP

(57) ABSTRACT

Disclosed are various embodiments for a direct current electric motor and generator. The motor comprises a housing. A frame is attached to an armature that traverses the center of the housing with the frame being attached to the armature within the housing. At least two permanent magnets are affixed to the frame such that a first magnetic field of a first one of the at least two permanent magnets is antiparallel to a second magnetic field of a second one of the at least two permanent magnets. Further, a wire is wrapped around the housing to form a pair of coils such that each coil in the pair of coils is affixed to the housing opposite the other coil in the pair of coils and the pair of coils are oriented in an antiparallel manner with respect to each other. Finally, a switching device is attached to the wire.

20 Claims, 10 Drawing Sheets

(56) References Cited

U.S. PATENT DOCUMENTS

| | | | | |
|---|---|---|---|---|
| 6,232,671 B1* | 5/2001 | Gottfried, Jr. | F16F 15/315 | 290/1 A |
| 6,326,714 B1* | 12/2001 | Bandera | H02K 26/00 | 310/152 |
| 6,870,277 B2* | 3/2005 | Pavlykivskyj | B60K 6/105 | 290/1 A |
| 6,933,818 B2* | 8/2005 | Kaneshige | H02K 26/00 | 310/156.01 |
| 7,989,975 B2* | 8/2011 | Clement | F03B 13/20 | 290/53 |
| 8,456,026 B2* | 6/2013 | Cleveland | F03B 13/20 | 290/1 A |
| 8,509,034 B2* | 8/2013 | Klinge | H04R 1/44 | 310/337 |
| 8,759,992 B1* | 6/2014 | Gottfried | H02K 7/02 | 290/1 A |
| 8,853,977 B1* | 10/2014 | Gottfried | H02K 7/025 | 123/179.1 |
| 2004/0140722 A1* | 7/2004 | Long | A63H 33/26 | 310/80 |
| 2006/0055270 A1* | 3/2006 | Petersen | H02K 3/28 | 318/400.32 |
| 2008/0106170 A1* | 5/2008 | Knowles | H01L 41/0993 | 310/328 |
| 2010/0158673 A1* | 6/2010 | Keene | F03D 3/0436 | 415/121.3 |
| 2011/0156396 A1* | 6/2011 | Cleveland | F03B 13/20 | 290/53 |
| 2012/0187795 A1* | 7/2012 | Clark | H02K 3/20 | 310/208 |
| 2013/0175854 A1* | 7/2013 | Chamberlin | B60L 3/0069 | 307/9.1 |
| 2014/0145537 A1* | 5/2014 | Goncalves | H02K 1/06 | 310/154.01 |
| 2014/0191595 A1* | 7/2014 | Miles | H02K 35/02 | 310/15 |
| 2014/0209751 A1* | 7/2014 | Stagmer | B64G 1/28 | 244/165 |
| 2014/0327246 A1* | 11/2014 | McCarthy | F02B 63/04 | 290/1 R |
| 2014/0375180 A1* | 12/2014 | Suzuki | H02K 11/048 | 310/68 D |

* cited by examiner

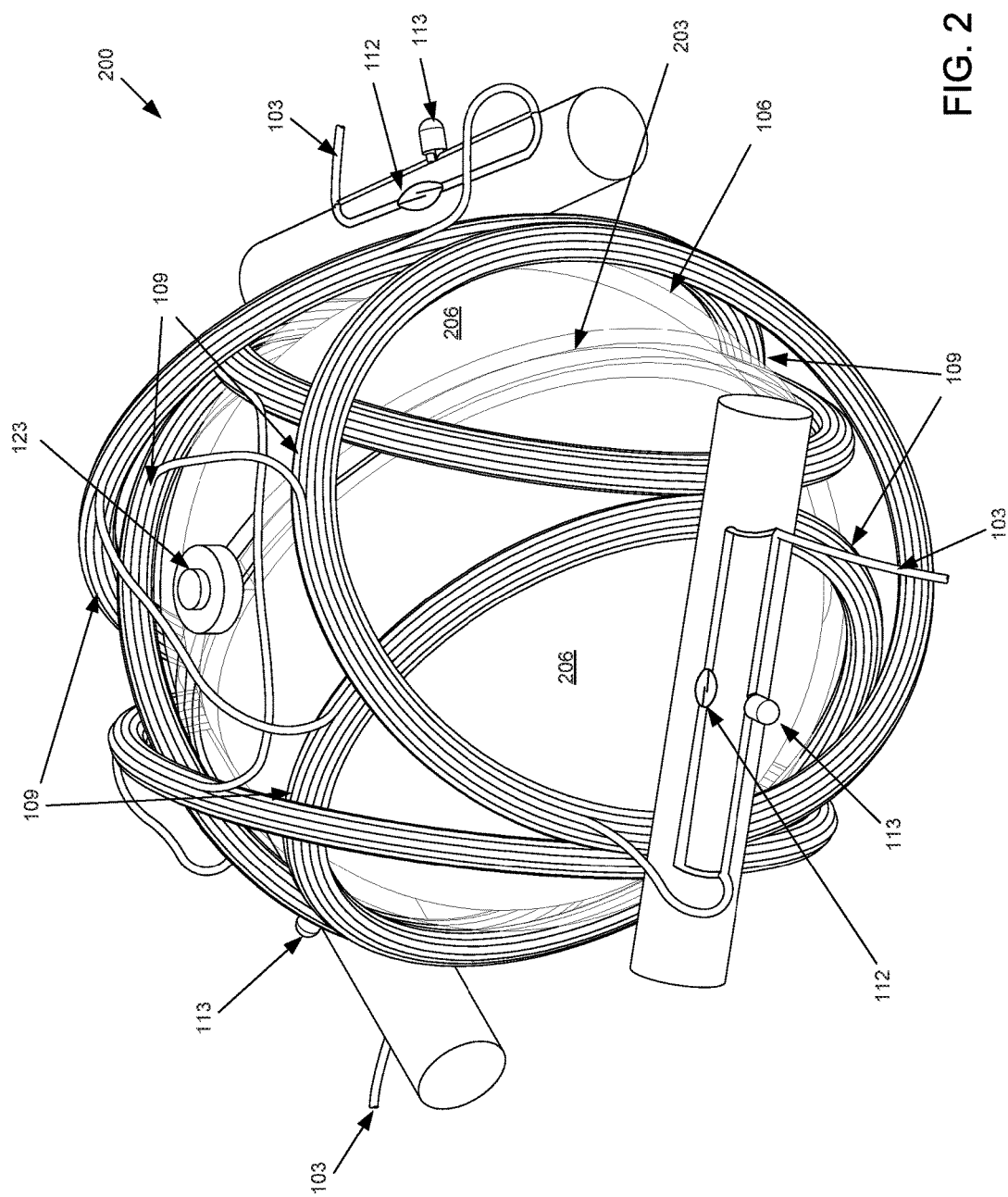

ELECTRIC MOTOR AND GENERATOR

CROSSREFERENCE TO RELATED APPLICATIONS

This application claims priority to and the benefit of U.S. Provisional Application No. 62/140,016, entitled "Brushless Electric Motor and Generator" and filed on Mar. 30, 2015, which is incorporated by reference as if set forth in its entirety herein.

BACKGROUND

Electric motors may be configured in a number of manners. Some electric motors may be configured to use alternating current or direct current. Other electric motors may be configured in a brushless or brushed manner. Various electric motors may also be configured to use electromagnets or permanent magnets.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a depiction of another one of the various embodiments of a brushless direct current motor and generator encompassed by this disclosure.

DETAILED DESCRIPTION

Depicted are various embodiments of an electric motor, such as a brushless electric motor operated with a direct current. Although a number of examples of brushless motor configurations are described below, the principals regarding the arrangements of the wire coils and permanent magnets in antiparallel are also applicable to brushed motor configurations. The constituent components and their assembly are described below, as is the method and mechanism of operation. However, in some embodiments of the disclosure, the various electric motors may be configured to function as a generator when a rotary mechanical device is attached to an armature of the motor. As such, any reference to a motor may also be interpreted as a reference to a generator.

Figure 1:
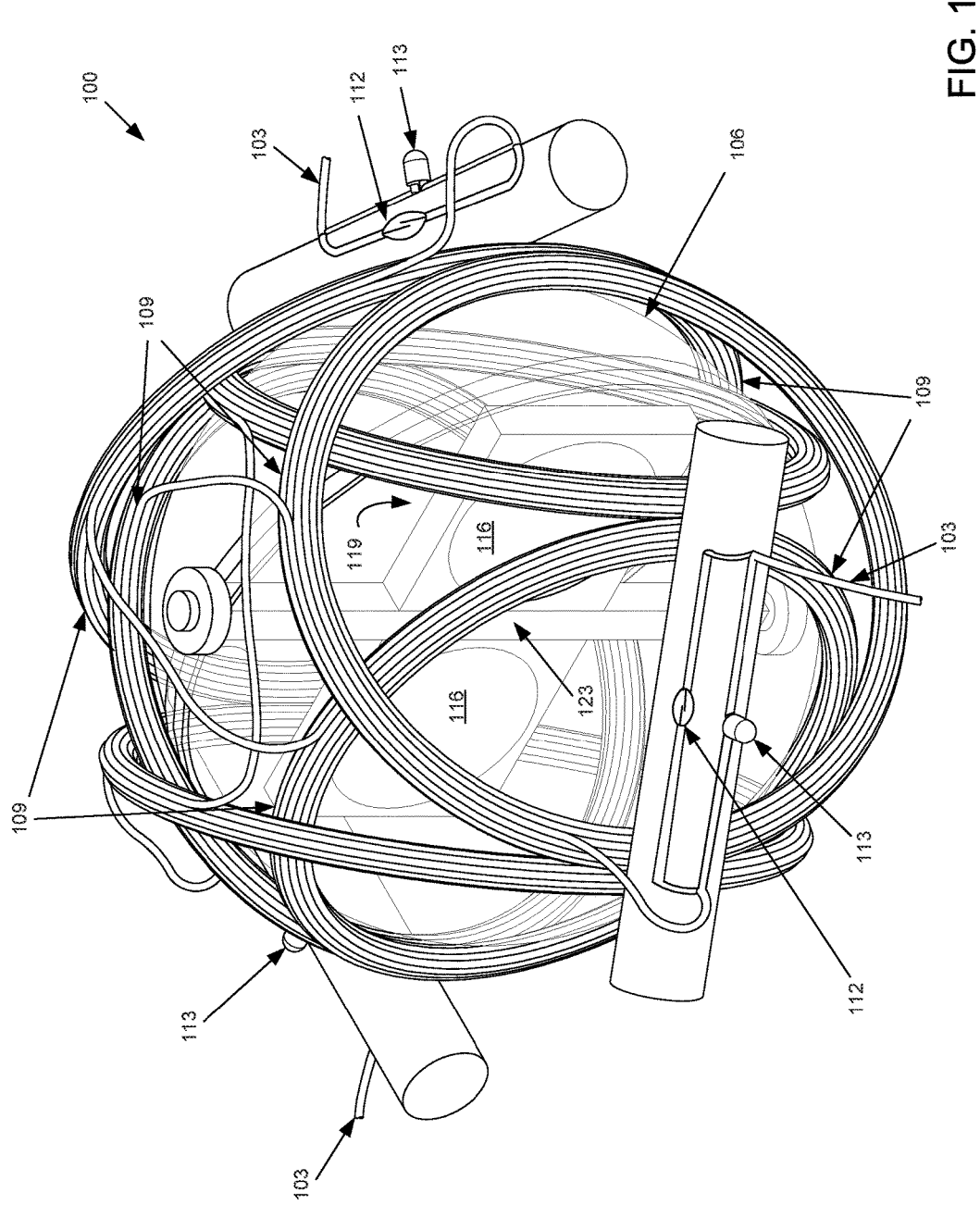
FIG. 1 is a depiction of one of the various embodiments of a brushless direct current motor and generator encompassed by this disclosure.

With reference to FIG. 1, shown is example of a brushless motor 100 according to various embodiments of the present disclosure. The brushless motor 100 depicted in FIG. 1 may, for example, correspond to a brushless direct current motor. Several wires 103 are wrapped around a spherical housing 106, such that each wire 103 forms a pair of wire coils 109. Although three wires 103 are depicted, it is understood that more wires 103 may be used in various embodiments of the present disclosure. Each of the coils in the pair of wire coils 109 is positioned on the opposite side of the spherical housing 106 from the other coil in the pair of wire coils 109. Further, each pair of wire coils 109 is positioned in an equiangular manner in relation with each of the other pairs of wire coils 109.

In various embodiments, the wire coils 109 may be wound in an opposing manner in order to generate opposite and opposing magnetic polarity when activated. For example, one wire coil 109 may be wound clockwise while the other wire coil 109 may be wound counterclockwise, such that a north pole of a magnetic field generated by each wire coil 109 is directed towards the interior of the spherical housing 106. In similar embodiments, a south pole of the magnetic field generated by each wire coil 109 is directed towards the spherical housing 106. Each end of each wire 103 is attached to an electrical power supply to form an electrical circuit.

Each wire 103 is also attached to a switching device 112 that allows for an electric circuit to be completed. The switching device 112 may include a reed switch, hall device (e.g., a hall effect sensor), or similar magnetically activated electric switch that activates based on the presence or absence of a magnetic field in the vicinity of the switching device 112 or based on an increase or decrease in a magnetic field in the vicinity of the switching device 112. However, other switching devices 112 can be used, such as commutators, microcontrolled electronic switches, and other switching devices 112. In various embodiments, the default position of the switching device 112 may be set to closed. Connected in antiparallel with the switching device 112 is a flyback diode 113, such as a light emitting diode (LED) or similar apparatus. The flyback diode 113 absorbs the electrical discharge generated when the switching device 112 cycles on or off. Various other devices or apparatuses may be used in place of the flyback diode 113 for the same purpose.

Within the spherical housing 106 are at least two permanent magnets 116. The permanent magnets 116 may include any type of permanent magnet, such as ferrite magnets, samarium-cobalt magnets, neodymium magnets, or similar magnets. However, neodymium magnets may be preferable due to the high ratio of their magnetic field relative to their weight and volume. The permanent magnets 116 are mounted within a frame 119 that is attached to an armature 123 traversing the interior of the spherical housing 106.

Assuming the correct starting position where the first magnetic switch is activated, when an electrical current is applied to a first wire 103, this causes each wire coil 109 in the pair of wire coils 109 formed from the first wire 103 to create a separate magnetic field, oriented in the manner previously described above. The magnetic field generated by the pair of wire coils 109 attracts and repels the permanent magnets 116. As the permanent magnets 116 attempt to move through the space inside the spherical housing 106 to the maximum points of attraction and repulsion, they move the frame 119, which in turn causes the armature 123 to rotate. As the permanent magnets 116 reach their point of maximum attraction and repulsion, the switching device 112 breaks the circuit created from applying the electric current to the first wire 103. Simultaneously, the switching device 112 in the next pair of wire coils 109 creates a circuit for an electric current applied to a second wire 103, causing the permanent magnets 116 to be attracted and repulsed by the corresponding fields generated by the second pair of wire coils 109, moving the frame 119 and causing the armature 123 to continue its rotation. As the permanent magnets 116 reach their point of maximum attraction and repulsion with regard to the second pair of wire coils 109, the switching device 112 for the second wire 103 breaks the circuit created from applying the electric current to the second wire 103. Concurrently with the end of the electric circuit formed on the second wire 103, the switching device 112 in the third pair of wire coils 109 creates a circuit for an electric current applied to a third wire 103, causing the permanent magnets 116 to be attracted and repulsed by the corresponding fields generated by the third pair of wire coils 109, moving the frame 119 and causing the armature 123 to continue its rotation through a full 360 degrees. As the permanent magnets 116 reach their point of maximum attraction and repulsion with regard to the third pair of wire coils 109, the switching device 112 for the third wire 103 breaks the circuit created from applying the electric current to the third wire 103. The frame 119 then returns to its original starting position and the cycle of rotations continues until the current applied to the wires 103 is stopped.

With reference to FIG. 2, shown is an example of a brushless motor 200 according to various embodiments of the present disclosure. The brushless motor 200 may, for example, correspond to a brushless direct current motor 200. Similarly, to the embodiment depicted in FIG. 1, the brushless motor 200 includes several wires 103 wrapped around a spherical housing 106, such that each wire 103 forms a pair of wire coils 109. Each of the coils in the pair of wire coils 109 is positioned opposite from the other coil in the pair of wire coils 109. Further, each pair of wire coils 109 is positioned in an equiangular manner in relation with each of the other pairs of wire coils 109. Each end of each wire 103 is attached to an electrical power supply to form an electrical circuit.

Each wire 103 is also attached to a switching device 112 that allows for an electric circuit to be completed. The switching device 112 may include a reed switch, hall device (e.g., a hall effect sensor), or similar magnetically activated electric switch. However, other switching devices 112, such as commutators, microcontrolled switching devices 112, and other switching devices 112, can be used in appropriate instances. In various embodiments, the default position of the switching device 112 may be set to closed. Connected in antiparallel with the switching device 112 is a flyback diode 113, such as a light emitting diode (LED) or other such apparatus. The flyback diode 113 absorbs the electrical discharge generated when the switching device 112 cycles on or off. Various other devices or apparatuses may be used in place of the flyback diode 113 for the same purpose.

Within the spherical housing 106, are two semicircular permanent magnets 203. The semicircular permanent magnets 203 may include any permanent magnet, such as ferrite magnets, samarium-cobalt magnets, neodymium magnets, or similar magnets. However, neodymium magnets may be preferable due to the high ratio of their magnetic field relative to their weight and volume. The semicircular permanent magnets 203 are mounted between two hemispherical frames 206 that are attached to an armature 123 traversing the interior of the spherical housing 106. This attaches the semicircular permanent magnets 203 to the armature 123.

Assuming the correct starting position where the first magnetic switch is activated, when an electrical current is applied to a first wire 103, this causes the pair of wire coils 109 formed from the first wire 103 to create a separate magnetic field, oriented in the manner previously described above. The magnetic field generated by the pair of wire coils 109 attracts and repels the semicircular permanent magnets 203. As the semicircular permanent magnets 203 attempt to move through the space inside the spherical housing 106 to the maximum points of attraction and repulsion, they move the hemispherical frames 206, which in turn cause the armature 123 to rotate. As the semicircular permanent magnets 203 reach their point of maximum attraction and repulsion, the switching device 112 breaks the circuit created from applying the electric current to the first wire 103. Simultaneously, the switching device 112 in the next pair of wire coils 109 creates a circuit for an electric current applied to a second wire 103, causing the semicircular permanent magnets 203 to be attracted and repulsed by the corresponding fields generated by the second pair of wire coils 109, moving the hemispherical frames 206 and causing the armature 123 to continue its rotation. As the semicircular permanent magnets 203 reach their point of maximum attraction and repulsion with regard to the second pair of wire coils 109, the switching device 112 for the second wire 103 breaks the circuit created from applying the electric current to the second wire 103. Concurrently with the end of the electric circuit formed on the second wire 103, the switching device 112 in the third pair of wire coils 109 creates a circuit for an electric current applied to a third wire 103, causing the semicircular permanent magnets 203 to be attracted and repulsed by the corresponding fields generated by the third pair of wire coils 109, moving the hemispherical frames 206 and causing the armature 123 to continue its rotation through a full 360 degrees. As the semicircular permanent magnets 203 reach their point of maximum attraction and repulsion with regard to the third pair of wire coils 109, the switching device 112 for the third wire 103 breaks the circuit created from applying the electric current to the third wire 103. The frame 119 then returns to its original position and the cycle of rotations continues until the current supplied to the wires 103 is terminated.

Figure 3A:
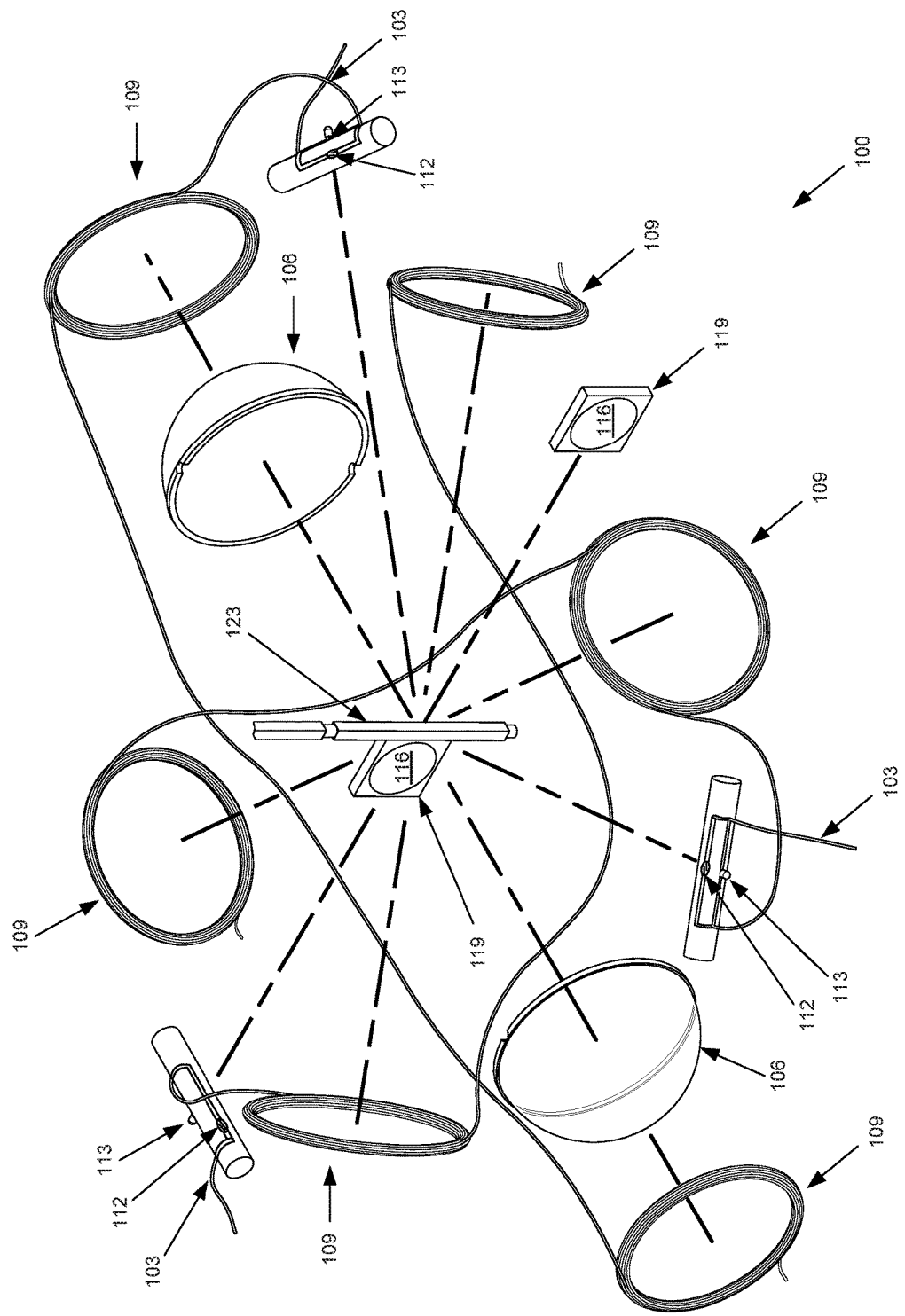
FIG. 3A is an expanded view of the embodiment depicted in FIG. 1 of the present disclosure.

With reference to FIG. 3A, shown is an expanded view of the brushless motor 100 depicted in FIG. 1. This expanded view illustrates in better detail how the wires 103 are wrapped around the spherical housing 106 to form the pairs of wire coils 109 illustrated in FIG. 1. This expanded view also better illustrates the location of each switching device 112 and flyback diode 113 depicted in FIG. 1 as well as how the permanent magnets 116 are mounted to the frame 119 and attached to the armature 123 that traverses the through the center of the spherical housing 106, as depicted in FIG. 1.

Figure 3B:
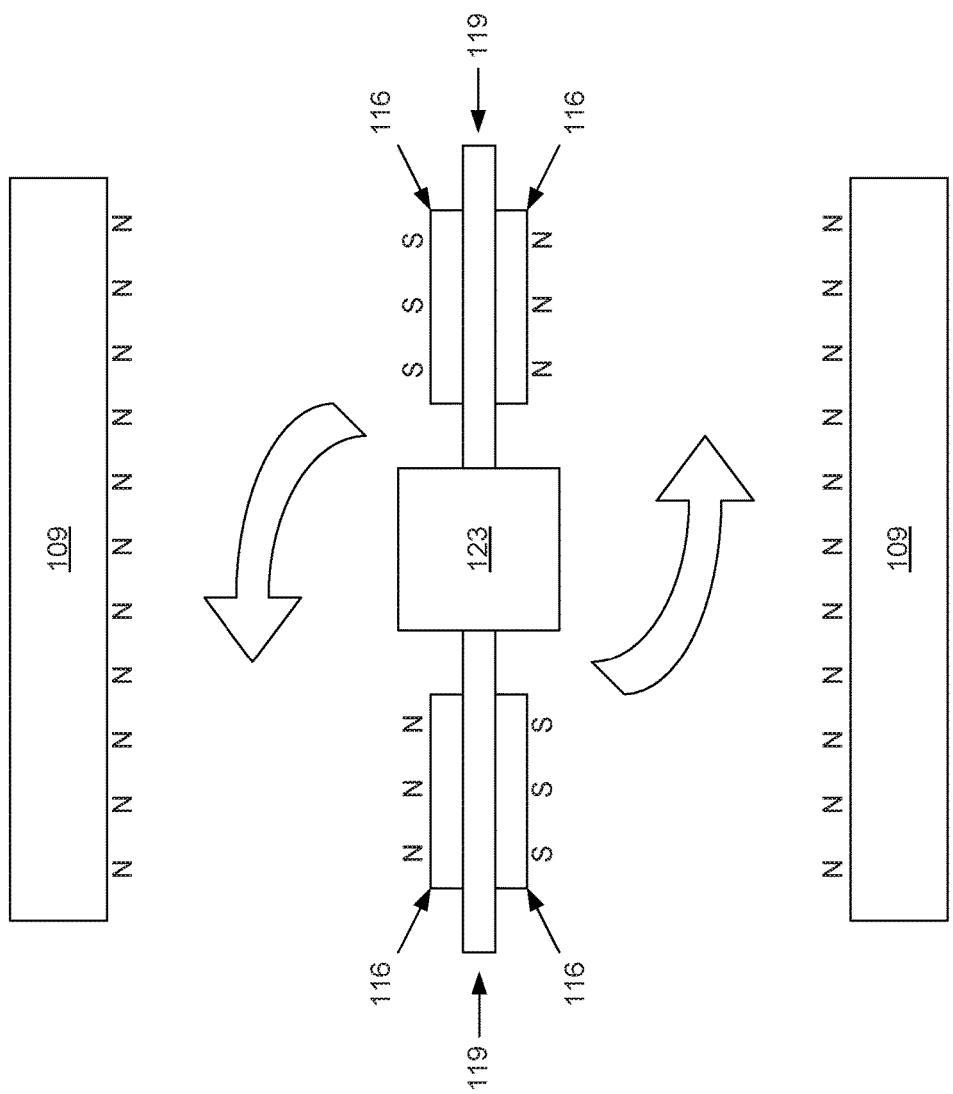
FIG. 3B is a depiction of the magnetic poles of various components of the brushless direct current motor and generator depicted in FIG. 1.

With reference to FIG. 3B, shown is schematic block diagram illustrating a top view of permanent magnets 116 mounted to the frame 119 attached to the armature 123. The North and South poles of each permanent magnet 116 are indicated with the symbols "N" and "S". Also shown are a pair of wire coils 109 wound in the manner previously described above, such that each wire coil 109 has the same magnetic pole facing towards the permanent magnets when an electric current passed through the wire 103 (FIG. 3A) that forms the pair of wire coils 109. In the illustrated example, each wire coil 109 is wound so that a North magnetic pole faces the permanent magnets 116. However, it is understood that pair of wire coils 109 could be wound in a manner such that each wire coil 109 in the pair of wire coils 109 creates a South magnetic pole facing the permanent magnets 116. This would reverse the rotation of the armature 123 from the direction illustrated in FIG. 3B.

When positioned between the pair of wire coils 109 wound in the manner previously described above, magnetic attraction and repulsion cause each of the permanent magnets 116 to move away from one of the coils 109 towards the other one of the coils 109. Because the permanent magnetic 116 on one side of the armature 123 is mounted to the frame 116 in the opposite manner of the other permanent magnet 116 on the other side of the armature 123, each permanent magnet 116 attempts to move in the opposite direction of the other permanent magnet 116. This maximizes the torque applied to the armature 123 as it rotates in the illustrated manner.

Figure 4A:
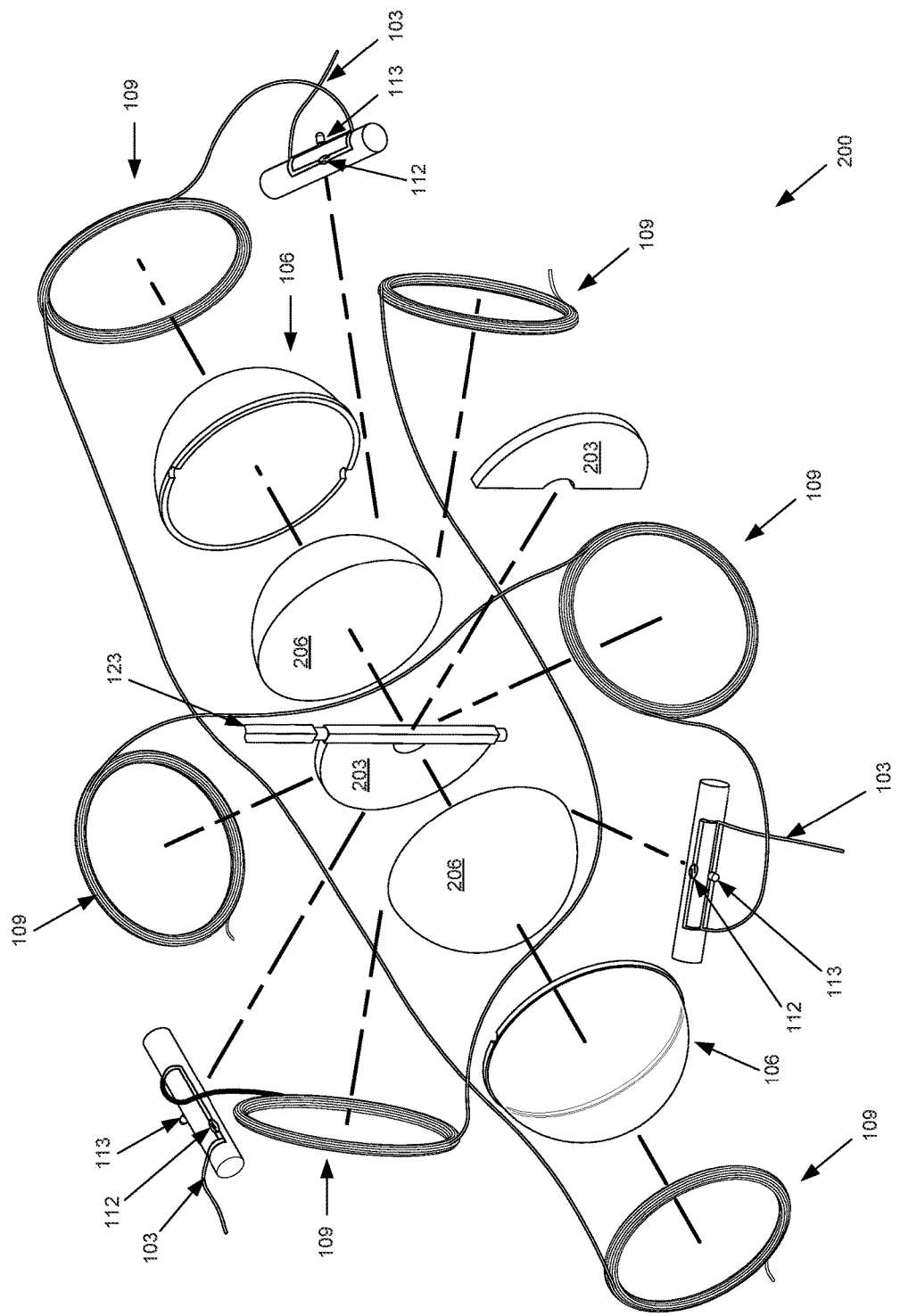
FIG. 4A is an expanded view of the embodiment depicted in FIG. 2 of the present disclosure.

With reference to FIG. 4A, shown is an expanded view of the brushless motor 200 depicted in FIG. 2. This expanded view illustrates in better detail how the wires 103 are wrapped around the spherical housing 106 to form the pairs of wire coils 109 illustrated in FIG. 2. This expanded view also better illustrates the location of each switching device 112 and flyback diode 113 depicted in FIG. 2 as well as how the semicircular permanent magnets 203 are mounted between the hemispherical frames 206 to affix the semicircular permanent magnets 203 to the armature 123, as depicted in FIG. 2.

Figure 4B:
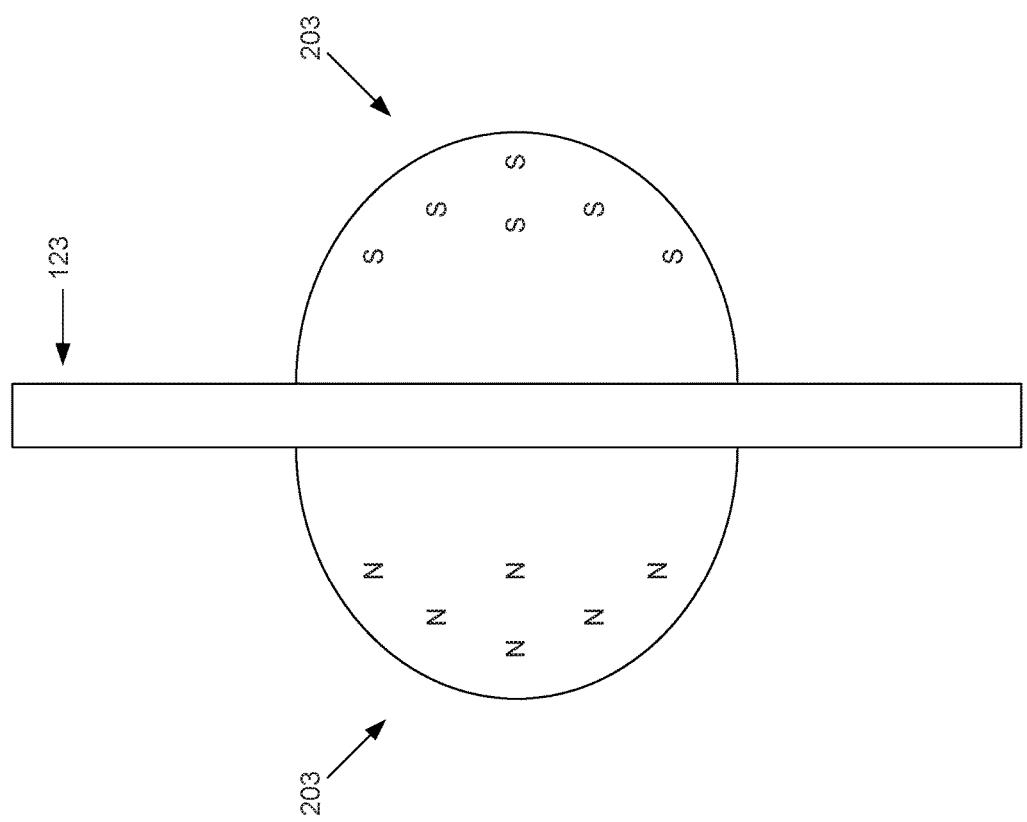
FIG. 4B is a depiction of the magnetic poles of various components of the brushless direct current motor and generator depicted in FIG. 2.

With reference to FIG. 4B, shown is side view of the semicircular permanent magnets 203 mounted to the armature 123, as previously illustrated in FIG. 4A. The North and South poles on the illustrated face of each semicircular permanent magnet 203 are shown and denoted with an "N" or "S" symbol respectively. It is understood that the reverse face (not illustrated) of each semicircular permanent magnet 203 would have an opposite polarity from what is illustrated. In other words, for the semicircular permanent magnet 203 shown with its North pole, the reverse face of the semicircular permanent magnet 203 would be the South pole of the semicircular permanent magnet 203. When positioned between two coils 109 of an electrical wire 103, the semicircular permanent magnets 203 would cause the armature 123 to rotate in a manner similar to that described in FIG. 3B.

Figure 5:
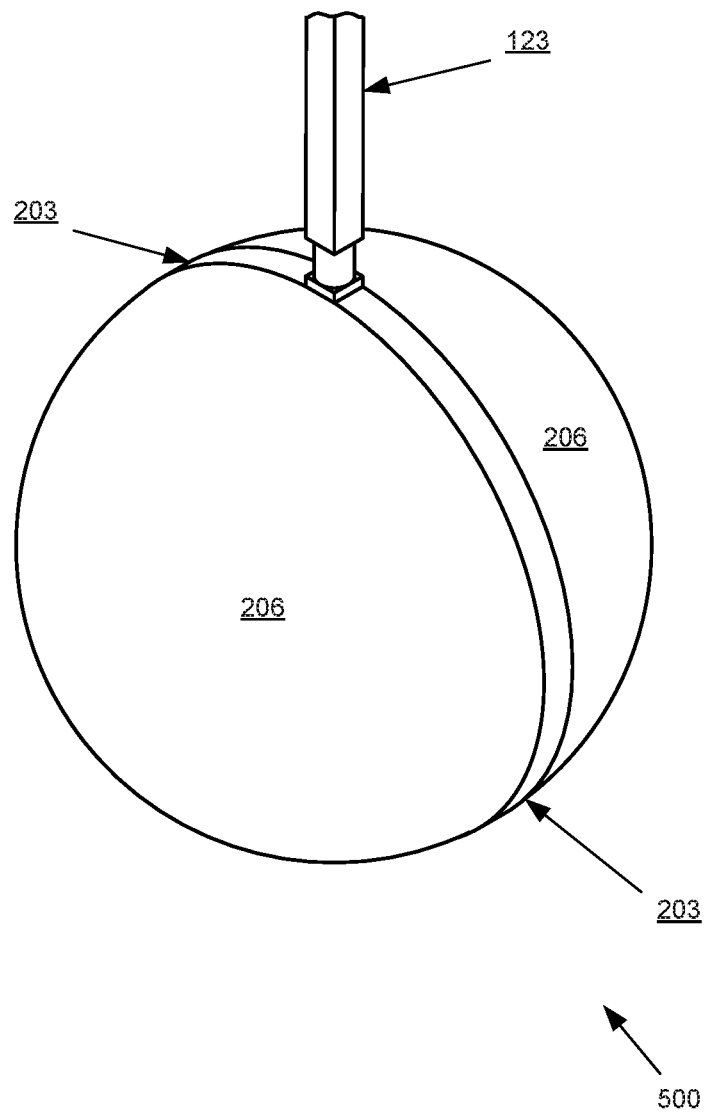
FIG. 5 is a depiction of the rotor assembly of the embodiment depicted in FIG. 2 of the present disclosure.

With reference to FIG. 5, shown is a depiction of the assembly 500 of the semicircular permanent magnets 203, the hemispherical frames 206 and the armature 123 within the spherical housing 106 (FIG. 2) of the brushless motor 200 (FIG. 2).

Figure 6:
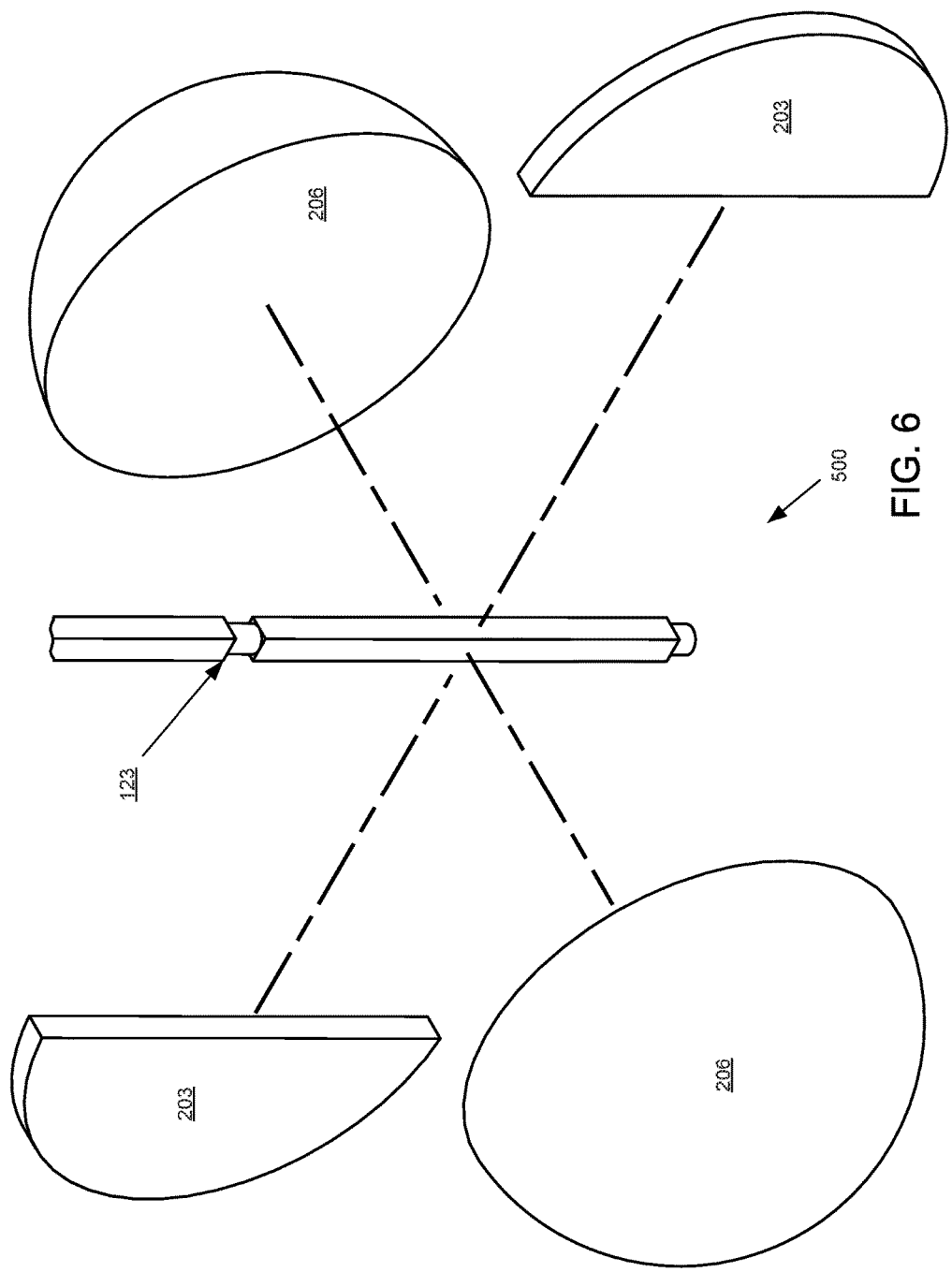
FIG. 6 is an expanded view of the rotor assembly depicted in FIG. 5 of the present disclosure.

With reference to FIG. 6, shown is an expanded view of the assembly 500 as previously depicted in FIG. 5. This expanded view of the assembly 500 further illustrates how the semicircular permanent magnets 203, hemispherical frames 206, and the armature 123 are affixed to each other. Also depicted are example alignments of the North and South poles of each semicircular permanent magnet 203.

Figure 7:
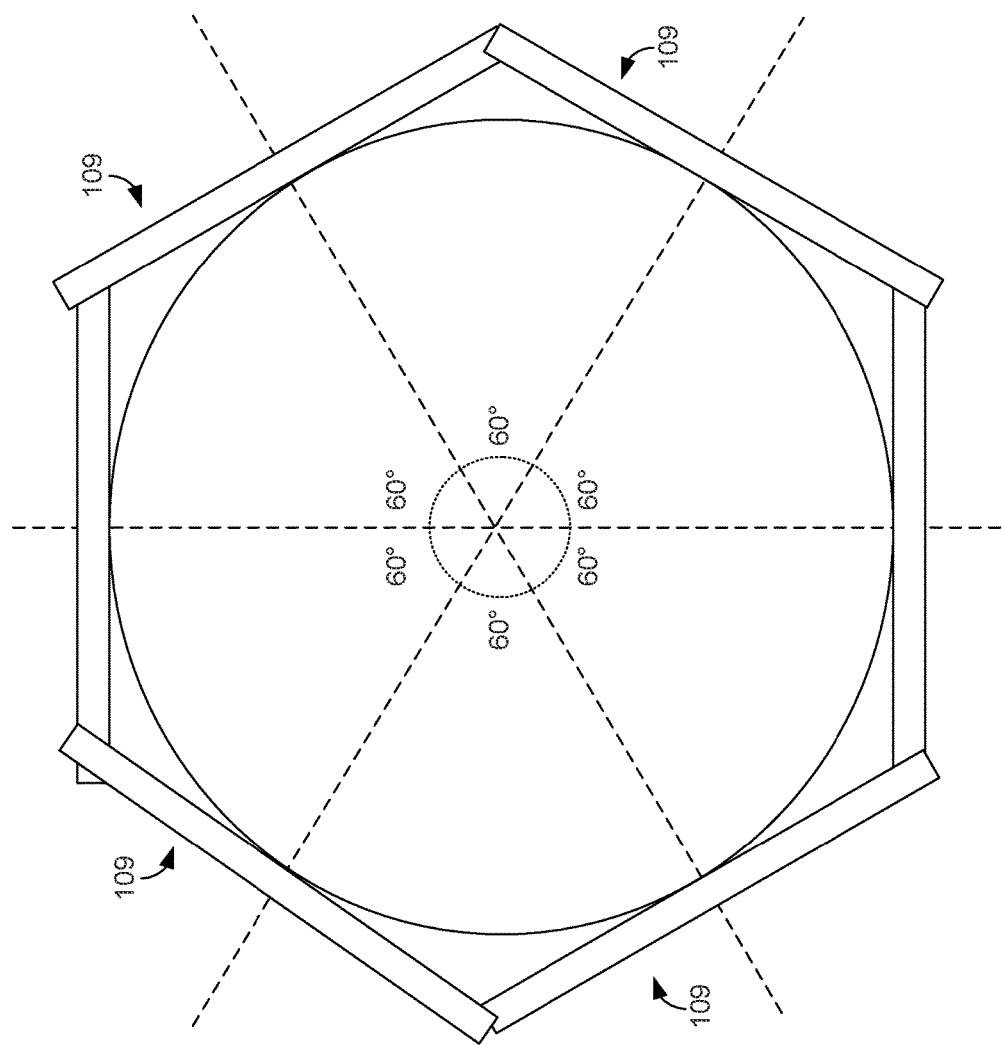
FIG. 7 depicts illustrates the spatial relationship between windings of wires into coils around a housing of the brushless direct current motor and generator depicted in FIG. 1 and FIG. 2.

FIG. 7 is an illustration depicting one example of a preferred spacing of wire coils 109 around a housing of the motor, such as the spherical housing 106 or a similar cylindrically shaped housing. As depicted, each wire coil 109 in a pair of wire coils is opposite the other wire coil 109 in the pair of wire coils. Moreover, each pair of wire coils 109 is offset by 60° from both adjacent pairs of wire coils 109, as indicated in FIG. 7. Using an equiangular spacing of the wire coils 109 maximizes the efficiency of the motor as an electric current is applied to individual pairs of wire coils 109 to propel the permanent magnets attached to the armature 123 around the interior of the spherical housing 106 or a similar cylindrically shaped housing.

Although FIG. 7 depicts six wire coils 109 that form three pairs of wire coils 109 spaced in an equiangular fashion, other equiangular arrangements may be just as efficient or more efficient. For example, 12 wire coils 109 forming six pairs of wire coils 109 spaced 30° apart would be another efficient spacing. Likewise, 18 wire coils 109 forming nine pairs of wire coils spaced 20° apart would be at least as efficient as the six or 12 wire embodiments.

The geometry of the various embodiments of the present disclosure offers a number of advantages in comparison to other motors. For example, optimum positioning of the switches 112, such as reed switches or hall devices, in relation to the wire coils 109 allows for the brushless motor 100 or the brushless motor 200 to operate at peak efficiency by automatically applying or removing an electric current from the pairs of wire coils 109 formed based on changes in the magnetic field caused from a movement of the permanent magnets 116 or the semicircular permanent magnets 203. This allows for operation of the motor without a computer or microcontroller programmatically controlling the current applied to the pairs of wire coils 109. It also allows for efficient operation of the brushless motor 100 or the brushless motor 200 by reducing the friction and maintenance associated with physical brushes.

Further, the permanent magnets within a spherical housing 106 maximizes the strength of the magnetic field used to operate the motor in comparison to other shapes or arrangements, such as a cylindrical housing, when six or fewer wire coils 109 are used. Further, use of a spherical housing 106, instead of a cylindrical housing, minimizes the volume of space occupied by the motor and allows for mounting the wire coils 109 at the optimal locations and with an optimum diameter relative to the size of the semicircular permanent magnets 203. In addition, use of a spherical housing 106 in conjunction with hemispherical frames 206, minimized internal air resistance to the operation of the motor within the spherical housing 106.

As a result, the various embodiments of motors described herein have a greater energy density compared to other motor designs, allowing for motors to generate higher torques and/or operate at higher power compared to similarly sized motors making use of other approaches. Similarly, torque is more uniformly maintained, reducing the number of "dead" spots when the motor is under load, where torque is not applied due to the position of the magnets attached to the armature in relation to the coils.

However, other embodiments than those illustrated and described above can be used in various situations. In some instances, these alternative embodiments may be preferable. For example, instead of a spherical housing 106, a cylindrically shaped housing could be employed. In these embodiments, rectangularly shaped permanent magnets could be used in place of semicircular permanent magnets 203 and a wire 103 could be wrapped around the cylindrical housing in a manner similar to that previously described above. The use of a cylindrically shaped housing and rectangularly shaped permanent magnets allows for a larger portions of the magnetic fields generated by the coils 109 to interact with the magnetic fields of the permanent magnets. As a result, the motor can operate more efficiently when using a cylindrical housing than when using a spherical housing 106 combined with semicircular permanent magnets 203. The improved performance of a cylindrical housing compared to a spherical housing 106 is most noticeable when 18 or more wire coils 109 are used. However, the use of the spherical housing 106 and semicircular permanent magnets 203 may still make more effective use of available space.

Moreover, the principals of the geometry of the various embodiments of the present disclosure are not limited to embodiments of a brushless motor, such as direct current brushless motors previously described. The benefits achieved are similarly applicable to brushed motors. As such, the embodiments previously described should be interpreted as illustrative examples of the various principles enabled by the present disclosure.

In addition, the various embodiments described herein are intended as illustrative examples of the disclosure. As such, the principals of the disclosure are not limited to the specific embodiments described herein. For example, another possible embodiment may include magnets or different shapes or sizes that the ones described above, such as square or rectangular magnets. Similarly, the frames and the housing may be shaped differently from the shapes described above.

Figure 8:
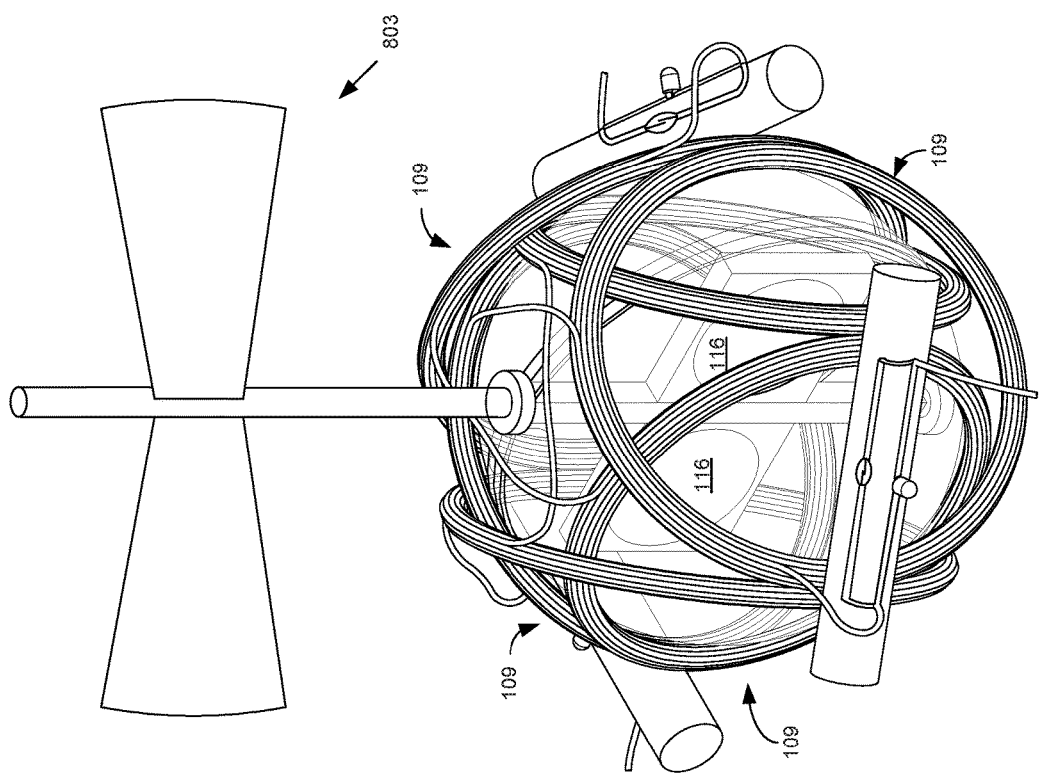
FIG. 8 depicts a generator according to the various embodiments of the present disclosure.

Finally, it should be noted that with minor modifications to the various embodiments described above, the motor may also be converted into a generator. An example configuration of a generator is depicted in FIG. 8. To convert the motor into a generator, one may join the loose ends of the wires 103 such that the positive leads are connected together and the negative leads are connected together. One can then attach a rotary mechanical device 803, such as a turbine, wheel, or other rotational device, to the armature 123 to rotate the armature. As the armature 123 is rotated by the rotational device 803, the magnets (e.g., the permanent magnets 116, semicircular permanent magnets 203, or other magnets described above) are moved through the wire coils 109, inducing a DC current in the wires. In some embodiments, a voltage regulator, such as a capacitor or other regulator, may be used to smooth out the resulting DC current.

I claim:

1. A brushless direct current electric motor, comprising:
   a spherical housing;
   an armature that traverses the center of the spherical housing along a longitudinal axis of the spherical housing;
   a frame affixed to the armature;
   at least two semicircularly shaped permanent magnets affixed to the frame;
   at least three wires, wherein:
      each of the at least three wires is wrapped around the spherical housing to form a pair of coils, such that each coil in the pair of coils is affixed to the spherical housing opposite the other coil in the pair of coils,
      each pair of coils formed from a respective one of the at least three wires is offset by 60° from the other pairs of coils formed from the other ones of the at least three wires, and
      each coil in the pair of coils is oriented with respect to the other coil in the pair of coils such that when an electric current is applied to the respective one of the at least three wires, each coil in the pair of coils simultaneously generates a respective magnetic field with the same pole directed towards the spherical housing; and
   at least three switching devices, each switching device connected to a respective one of the at least three wires.

2. The brushless direct current electric motor of claim 1, further comprising a flyback diode connected in an antiparallel manner with at least one of the at least three switching devices.

3. The brushless direct current electric motor of claim 1, wherein at least one of the at least three switching devices comprises a reed switch.

4. The brushless direct current electric motor of claim 1, wherein at least one of the at least three switching devices comprises a Hall effect sensor.

5. The brushless direct current electric motor of claim 1, wherein at least one of the at least two semicircularlly shaped permanent magnets comprises a neodymium magnet.

6. The brushless, direct current electric motor of claim 1, further comprising a rectifier attached to at least one of the at least three wires.

7. The brushless, direct current electric motor of claim 1, further comprising two hemispherical mounts affixed to the armature, wherein the at least two semicircularly shaped permanent magnets are affixed to the armature between the two hemispherical mounts.

8. An apparatus, comprising:
   a housing;
   a frame attached to an armature, wherein the armature traverses the center of the housing and the frame is attached to the armature within the housing;
   at least two permanent magnets affixed to the frame, wherein the at least two permanent magnets are affixed to the frame such that a first north pole and first south pole of a first magnetic field of a first one of the at least two permanent magnets is oriented in an opposite direction to a second north pole and a second south pole of a second magnetic field of a second one of the at least two permanent magnets;
   at least three wires, wherein:
      each of the at least three wires is wrapped around the housing to form a pair of coils, such that each coil in the pair of coils is affixed to the-housing opposite the other coil in the pair of coils,
      each pair of coils formed from a respective one of the at least three wires is offset by 60° from the other pairs of coils formed from the other ones of the at least three wires, and
      each coil in the pair of coils is oriented with respect to the other coil in the pair of coils such that when an electric current is applied to the respective one of the at least three wires, each coil in the pair of coils simultaneously generates a respective magnetic field with the same pole directed towards the housing; and
   at least three switching devices, each switching device connected to a respective one of the at least three wires.

9. The apparatus of claim 8, further comprising a rectifier coupled to at least one of the at least three wires.

10. The apparatus of claim 8, further comprising a flyback diode connected in an antiparallel manner with at least one of the at least three switching devices.

11. The apparatus of claim 8, wherein at least one of the at least three switching devices comprises a reed switch.

12. The apparatus of claim 8, wherein at least one of the at least three switching devices comprises a Hall effect sensor.

13. The apparatus of claim 8, wherein the housing comprises a spherically shaped housing and each of the at least two permanent magnets is semicircularly shaped.

14. A device, comprising:
   a housing;
   a rotary mechanical device coupled to an armature that traverses through the center of the housing, wherein the rotary mechanical device is configured to rotate the armature in response to an application of a mechanical force to the rotary mechanical device;

a frame attached to the armature at a point on the armature inside of the housing;

at least two permanent magnets affixed to the frame;

at least three wires, wherein each of the at least three wires is wrapped around the housing to form a pair of coils, such that each coil in the pair of coils is affixed to the housing opposite the other coil in the pair of coils, each pair of coils formed from a respective one of the at least three wires is offset by 60° from the other pairs of coils formed from the other ones of the at least three wires, and each coil in the pair of coils is oriented with respect to the other coil in the pair of coils such that when an electric current is applied to the respective one of the at least three wires, each coil in the pair of coils simultaneously generates a respective magnetic field with the same pole directed towards the spherical housing; and at least three switching devices, each switching device connected to a respective one of the at least three wires.

15. The device of claim 14, further comprising a flyback diode connected in an antiparallel manner with each switching device.

16. The device of claim 14, wherein at least one of the at least three switching devices comprises a reed switch.

17. The apparatus of claim 16, wherein the reed switch is activated by either a presence or an absence of a resultant magnetic field of the at least two permanent magnets affixed to the frame in a vicinity of the reed switch; or an increase or a decrease in a strength of the resultant magnetic field of the at least two permanent magnets affixed to the frame in the vicinity of reed switch.

18. The device of claim 14, wherein at least one of the at least three switching devices comprises a Hall effect sensor.

19. The device of claim 14, wherein the housing is spherically shaped.

20. The device of claim 14, wherein the rotary mechanical device comprises a turbine.

* * * * *